(12) United States Patent  
Landau et al.

(10) Patent No.: US 7,967,214 B2
(45) Date of Patent: Jun. 28, 2011

(54) CARD CONFIGURED TO RECEIVE SEPARATE BATTERY

(75) Inventors: Steven Landau, Oldsmar, FL (US); David Corey, Lakeland, FL (US)

(73) Assignee: Solicore, Inc., Lakeland, FL (US)

( * ) Notice: Subject to any disclaimer, the term of this patent is extended or adjusted under 35 U.S.C. 154(b) by 271 days.

(21) Appl. No.: 11/966,018

(22) Filed: Dec. 28, 2007

(65) Prior Publication Data

US 2008/0156885 A1 Jul. 3, 2008

Related U.S. Application Data

(60) Provisional application No. 60/877,637, filed on Dec. 29, 2006.

(51) Int. Cl.
*G06K 19/06* (2006.01)
(52) U.S. Cl. ........................................ 235/492; 235/487
(58) Field of Classification Search .................. 235/492, 235/487
See application file for complete search history.

(56) References Cited

U.S. PATENT DOCUMENTS

| | | | |
|---|---|---|---|
| 3,773,251 A | 11/1973 | Hadick | |
| 3,908,827 A * | 9/1975 | Bemmels et al. | 206/478 |
| 3,999,700 A | 12/1976 | Chalmers | |
| 4,055,014 A | 10/1977 | Schmidt et al. | |
| 4,286,399 A | 9/1981 | Funahashi et al. | |
| 4,299,041 A | 11/1981 | Wilson | |
| 4,575,621 A | 3/1986 | Dreifus | |
| 4,607,747 A | 8/1986 | Steiner | |
| 4,614,861 A | 9/1986 | Pavlov et al. | |
| 4,667,087 A | 5/1987 | Quintanat | |
| 4,680,724 A | 7/1987 | Sugiyama et al. | |
| 4,689,478 A | 8/1987 | Hale et al. | |
| 4,692,601 A | 9/1987 | Nakano | |
| 4,701,601 A | 10/1987 | Francini | |
| 4,707,594 A | 11/1987 | Roth | |

(Continued)

FOREIGN PATENT DOCUMENTS

JP 06-191182 7/1994

(Continued)

OTHER PUBLICATIONS

International Search Report & Written Opinion, Jun. 4, 2008.

(Continued)

*Primary Examiner* — Michael G Lee
*Assistant Examiner* — Tabitha Chedekel
(74) *Attorney, Agent, or Firm* — Morris, Manning & Martin, LLP; Christopher W. Raimund

(57) ABSTRACT

An electronic card comprises a thin, flexible substrate having electrical circuitry embedded therein. An activation device is disposed in the substrate and is configured to complete a circuit in response to a stimulus, such as light or sound. An output device is disposed in the substrate and is configured to produce an output, such as music or vibration, wherein the output device is activated upon the completion of the circuit by the activation device. A cavity is formed in an outer surface of the substrate and has electrical contacts at an inner portion thereof in electrical communication with the electrical circuitry. The cavity further comprises retaining means for replaceably retaining a battery in the cavity to enable the battery to provide power to the electrical circuitry, the activation device, and the output device. The retaining means allows a battery to be removed from the cavity and replaced with another battery.

8 Claims, 3 Drawing Sheets

U.S. PATENT DOCUMENTS

| | | | |
|---|---|---|---|
| 4,719,453 A | 1/1988 | Beck et al. |
| 4,726,771 A | 2/1988 | Weinblatt |
| 4,728,978 A | 3/1988 | Inoue et al. |
| 4,749,982 A | 6/1988 | Rikuna et al. |
| 4,754,418 A | 6/1988 | Hara |
| 4,755,660 A | 7/1988 | Nakano |
| 4,764,666 A | 8/1988 | Bergeron |
| 4,794,236 A | 12/1988 | Kawana |
| 4,797,542 A | 1/1989 | Hara |
| 4,800,255 A | 1/1989 | Imran |
| 4,812,634 A | 3/1989 | Ohta et al. |
| 4,827,111 A | 5/1989 | Kondo |
| 4,829,166 A | 5/1989 | Froelich |
| 4,837,422 A | 6/1989 | Dethloff |
| 4,864,115 A | 9/1989 | Imran et al. |
| 4,868,376 A | 9/1989 | Lessin et al. |
| 4,876,441 A | 10/1989 | Hara et al. |
| 4,879,455 A | 11/1989 | Butterworth et al. |
| 4,884,092 A | 11/1989 | Inoue et al. |
| 4,887,115 A | 12/1989 | Inoue et al. |
| 4,916,434 A | 4/1990 | McNeely |
| 4,918,631 A | 4/1990 | Hara et al. |
| 4,924,075 A | 5/1990 | Tanaka |
| 4,939,326 A | 7/1990 | Weinblatt |
| 4,968,873 A | 11/1990 | Dethloff |
| 5,001,775 A | 3/1991 | Hayashi et al. |
| 5,010,237 A | 4/1991 | Kawana |
| 5,017,766 A | 5/1991 | Tamada et al. |
| 5,025,373 A | 6/1991 | Keyser et al. |
| 5,072,103 A | 12/1991 | Nara |
| 5,081,482 A | 1/1992 | Miki et al. |
| 5,134,434 A | 7/1992 | Inoue et al. |
| 5,177,789 A | 1/1993 | Covert |
| 5,180,902 A | 1/1993 | Schick |
| 5,181,744 A | 1/1993 | Betheil |
| 5,192,947 A | 3/1993 | Neustein |
| 5,193,275 A | 3/1993 | Hirokazu et al. |
| 5,209,665 A | 5/1993 | Billings et al. |
| 5,240,792 A * | 8/1993 | Kawabata et al. ............ 429/100 |
| 5,245,171 A | 9/1993 | Fox et al. |
| 5,267,218 A | 11/1993 | Elbert |
| 5,297,205 A | 3/1994 | Audebert et al. |
| 5,317,636 A | 5/1994 | Vizcaino |
| 5,343,519 A | 8/1994 | Feldman |
| 5,350,945 A | 9/1994 | Hayakawa |
| 5,373,283 A | 12/1994 | Maharshak |
| 5,399,847 A | 3/1995 | Droz |
| 5,412,192 A | 5/1995 | Hoss |
| 5,412,199 A | 5/1995 | Finkelstein et al. |
| D359,305 S | 6/1995 | Finkelstein |
| 5,433,035 A | 7/1995 | Bauer |
| 5,434,398 A | 7/1995 | Goldberg |
| 5,434,405 A | 7/1995 | Finkelstein et al. |
| 5,449,994 A | 9/1995 | Armand et al. |
| 5,450,491 A | 9/1995 | McNair |
| 5,451,763 A | 9/1995 | Pickett et al. |
| 5,452,352 A | 9/1995 | Talton |
| 5,457,613 A | 10/1995 | Vandenbelt et al. |
| 5,465,082 A | 11/1995 | Chaco |
| 5,484,997 A | 1/1996 | Haynes |
| 5,520,544 A | 5/1996 | Manico et al. |
| 5,529,503 A | 6/1996 | Kerklaan |
| 5,530,235 A | 6/1996 | Stefik et al. |
| 5,539,819 A | 7/1996 | Sonoyama et al. |
| 5,580,794 A | 12/1996 | Allen |
| 5,583,933 A | 12/1996 | Mark |
| 5,585,618 A | 12/1996 | Droz |
| 5,585,787 A | 12/1996 | Wallerstein |
| 5,590,038 A | 12/1996 | Pitroda |
| 5,608,203 A | 3/1997 | Finkelstein et al. |
| 5,636,271 A | 6/1997 | Paterno et al. |
| 5,641,164 A | 6/1997 | Doederlein et al. |
| 5,642,095 A | 6/1997 | Cook |
| 5,652,838 A | 7/1997 | Lovett et al. |
| 5,671,271 A | 9/1997 | Henderson et al. |
| 5,676,307 A | 10/1997 | Martin |
| D387,802 S | 12/1997 | Finkelstein et al. |
| 5,741,392 A | 4/1998 | Droz |
| 5,743,801 A | 4/1998 | Welander |
| 5,745,555 A | 4/1998 | Mark |
| 5,748,082 A | 5/1998 | Payne |
| 5,748,737 A | 5/1998 | Daggar |
| 5,749,735 A | 5/1998 | Redford et al. |
| 5,767,896 A | 6/1998 | Nemirofsky |
| 5,777,903 A | 7/1998 | Piosenka et al. |
| 5,778,076 A | 7/1998 | Kara et al. |
| 5,789,732 A | 8/1998 | McMahon et al. |
| 5,790,027 A | 8/1998 | Chern |
| 5,793,027 A | 8/1998 | Baik |
| 5,796,834 A | 8/1998 | Whitney et al. |
| 5,803,748 A | 9/1998 | Maddrell et al. |
| 5,818,030 A | 10/1998 | Reyes |
| 5,818,930 A | 10/1998 | Mark |
| 5,825,871 A | 10/1998 | Mark |
| 5,834,747 A | 11/1998 | Cooper, Jr. |
| 5,836,616 A | 11/1998 | Cooper |
| 5,837,546 A | 11/1998 | Allen et al. |
| 5,841,878 A | 11/1998 | Arnold et al. |
| 5,844,218 A | 12/1998 | Kawan et al. |
| 5,856,661 A | 1/1999 | Finkelstein et al. |
| 5,857,079 A | 1/1999 | Claus et al. |
| 5,861,602 A | 1/1999 | Cox et al. |
| 5,861,662 A | 1/1999 | Candelore |
| 5,884,271 A | 3/1999 | Pitroda |
| 5,889,267 A | 3/1999 | Robin et al. |
| 5,903,869 A | 5/1999 | Jacobson et al. |
| 5,910,987 A | 6/1999 | Ginter et al. |
| 5,914,657 A | 6/1999 | Chen |
| 5,916,024 A | 6/1999 | Von Kohorn |
| 5,922,489 A * | 7/1999 | Adachi ........................ 429/100 |
| 5,934,789 A | 8/1999 | Sinclair et al. |
| 5,955,021 A | 9/1999 | Tiffany, III |
| 5,955,961 A | 9/1999 | Wallerstein |
| 5,961,451 A | 10/1999 | Reber et al. |
| 5,971,282 A | 10/1999 | Rollender et al. |
| 5,980,309 A * | 11/1999 | Frantz et al. .................. 439/500 |
| 5,988,510 A | 11/1999 | Tuttle et al. |
| 6,003,769 A | 12/1999 | Ebbing |
| 6,012,049 A | 1/2000 | Kawan |
| 6,019,284 A | 2/2000 | Freeman et al. |
| 6,021,306 A | 2/2000 | McTaggart |
| 6,025,054 A | 2/2000 | Tiffany, III |
| 6,028,752 A | 2/2000 | Chomette et al. |
| 6,028,926 A | 2/2000 | Henderson et al. |
| 6,039,454 A | 3/2000 | Hallgrimsson |
| 6,041,215 A | 3/2000 | Maddrell et al. |
| 6,044,153 A | 3/2000 | Kaschke |
| 6,049,277 A | 4/2000 | Osame |
| 6,061,344 A | 5/2000 | Wood, Jr. |
| 6,064,988 A | 5/2000 | Thomas |
| 6,068,192 A | 5/2000 | McCabe et al. |
| 6,070,990 A | 6/2000 | Dalton et al. |
| 6,081,793 A | 6/2000 | Challener et al. |
| 6,089,451 A | 7/2000 | Krause |
| 6,104,280 A | 8/2000 | Tuttle et al. |
| 6,109,530 A | 8/2000 | Larson et al. |
| 6,109,762 A | 8/2000 | Hallgrimsson et al. |
| 6,129,277 A | 10/2000 | Grant et al. |
| 6,161,276 A | 12/2000 | Droz |
| 6,173,897 B1 | 1/2001 | Halpern |
| 6,176,010 B1 | 1/2001 | Droz |
| 6,176,430 B1 | 1/2001 | Finkelstein et al. |
| 6,184,788 B1 | 2/2001 | Middlemiss |
| 6,188,309 B1 | 2/2001 | Levine |
| 6,206,291 B1 | 3/2001 | Droz |
| 6,223,348 B1 | 4/2001 | Hayes |
| 6,230,003 B1 | 5/2001 | Macor |
| 6,236,724 B1 | 5/2001 | Labaton et al. |
| 6,239,976 B1 | 5/2001 | Tempelton et al. |
| 6,241,153 B1 | 6/2001 | Tiffany, III |
| D444,465 S | 7/2001 | Do |
| 6,254,001 B1 | 7/2001 | Chan |
| 6,256,873 B1 | 7/2001 | Tiffany, III |
| 6,264,108 B1 | 7/2001 | Baentsch |
| 6,273,339 B1 | 8/2001 | Tuttle et al. |
| 6,282,186 B1 | 8/2001 | Wood, Jr. |
| 6,282,819 B1 | 9/2001 | Gu |

| | | |
|---|---|---|
| 6,283,367 B1 | 9/2001 | Matthew et al. |
| 6,284,406 B1 | 9/2001 | Xing et al. |
| 6,289,324 B1 | 9/2001 | Kawan |
| 6,293,470 B1 * | 9/2001 | Asplund ............ 235/487 |
| 6,297,789 B2 | 10/2001 | Gauthier et al. |
| 6,308,890 B1 | 10/2001 | Cooper |
| 6,349,829 B1 | 2/2002 | Matheis et al. |
| 6,352,604 B2 | 3/2002 | Droz |
| 6,353,811 B1 | 3/2002 | Weissman |
| 6,360,954 B1 | 3/2002 | Barnardo |
| RE37,660 E | 4/2002 | Talton |
| 6,372,307 B1 | 4/2002 | Ji et al. |
| 6,375,081 B1 | 4/2002 | Hileman et al. |
| 6,392,881 B1 | 5/2002 | Saitoh |
| 6,402,039 B1 | 6/2002 | Freeman et al. |
| 6,414,441 B1 | 7/2002 | Fries et al. |
| 6,447,143 B2 | 9/2002 | Krietzman et al. |
| 6,454,435 B1 | 9/2002 | Altman |
| 6,459,376 B2 | 10/2002 | Trasper |
| 6,498,847 B1 | 12/2002 | Henderson et al. |
| 6,507,913 B1 | 1/2003 | Shamir |
| 6,533,436 B2 | 3/2003 | Krietzman et al. |
| 6,545,605 B2 | 4/2003 | Van Horn et al. |
| 6,547,984 B2 | 4/2003 | Kobayashi et al. |
| 6,553,244 B2 | 4/2003 | Lesho et al. |
| 6,563,563 B2 | 5/2003 | Adams et al. |
| 6,567,539 B1 | 5/2003 | Benezeth |
| 6,573,880 B1 | 6/2003 | Simoni et al. |
| 6,579,728 B2 | 6/2003 | Grant et al. |
| 6,591,524 B1 | 7/2003 | Lewis et al. |
| 6,592,031 B1 | 7/2003 | Klatt |
| 6,592,044 B1 | 7/2003 | Wong et al. |
| 6,604,685 B1 | 8/2003 | Norton |
| 6,607,127 B2 | 8/2003 | Wong |
| 6,607,136 B1 | 8/2003 | Atsmon et al. |
| 6,616,035 B2 | 9/2003 | Ehrensvard et al. |
| 6,619,553 B1 | 9/2003 | Bobrov et al. |
| 6,629,019 B2 | 9/2003 | Legge |
| 6,631,849 B2 | 10/2003 | Blossom |
| 6,641,050 B2 | 11/2003 | Kelley et al. |
| 6,693,513 B2 | 2/2004 | Tuttle et al. |
| 6,693,515 B2 | 2/2004 | Clapper |
| 6,705,520 B1 | 3/2004 | Pitroda et al. |
| 6,734,881 B1 | 5/2004 | Will |
| 6,739,505 B2 | 5/2004 | Walker et al. |
| 6,742,713 B1 | 6/2004 | Trinkel |
| 6,748,359 B1 | 6/2004 | Colnot |
| 6,753,830 B2 | 6/2004 | Gelbman |
| 6,758,404 B2 | 7/2004 | Ladyansky |
| 6,764,005 B2 | 7/2004 | Cooper |
| 6,769,607 B1 | 8/2004 | Pitroda |
| 6,769,618 B1 | 8/2004 | Finkelstein |
| 6,811,082 B2 | 11/2004 | Wong |
| 6,816,058 B2 | 11/2004 | McGregor et al. |
| 6,817,532 B2 | 11/2004 | Finkelstein |
| 6,840,455 B1 | 1/2005 | Norton |
| 6,854,657 B2 | 2/2005 | Johnson |
| 6,870,483 B1 | 3/2005 | Davis |
| 6,880,079 B2 | 4/2005 | Kefford et al. |
| 6,892,951 B2 | 5/2005 | Goldenberg et al. |
| 6,902,115 B2 | 6/2005 | Graf et al. |
| 6,902,116 B2 | 6/2005 | Finkelstein |
| 6,906,436 B2 | 6/2005 | Jenson et al. |
| 6,908,036 B2 | 6/2005 | Koshimizu et al. |
| 6,925,439 B1 | 8/2005 | Pitroda |
| 6,954,133 B2 | 10/2005 | McGregor et al. |
| 6,957,774 B1 | 10/2005 | Sung |
| 6,966,497 B1 | 11/2005 | Hohmann et al. |
| 6,971,581 B2 | 12/2005 | Droz |
| 6,986,965 B2 | 1/2006 | Jenson et al. |
| 6,991,155 B2 | 1/2006 | Burchette, Jr. |
| 7,003,495 B1 | 2/2006 | Burger et al. |
| 7,012,504 B2 | 3/2006 | Tuttle et al. |
| 7,025,277 B2 | 4/2006 | Forrest et al. |
| 7,036,730 B2 | 5/2006 | Chung |
| 7,036,740 B2 | 5/2006 | Waters |
| 7,051,929 B2 | 5/2006 | Li |
| 7,059,531 B2 | 6/2006 | Beenau et al. |
| 7,063,266 B2 | 6/2006 | Goldenberg et al. |
| 7,071,422 B2 | 7/2006 | Droz |
| 7,076,652 B2 | 7/2006 | Ginter et al. |
| 7,080,037 B2 | 7/2006 | Burger et al. |
| 7,083,083 B2 | 8/2006 | Droz |
| 7,083,094 B2 | 8/2006 | Cooper |
| 7,083,105 B2 | 8/2006 | Maruyama et al. |
| 7,090,123 B2 | 8/2006 | Walker et al. |
| 7,090,139 B2 | 8/2006 | Kasuga et al. |
| 7,097,108 B2 | 8/2006 | Zellner et al. |
| 7,150,406 B2 | 12/2006 | Droz |
| 7,183,929 B1 | 2/2007 | Antebi et al. |
| 7,237,724 B2 | 7/2007 | Singleton |
| 7,260,221 B1 | 8/2007 | Atsmon et al. |
| 2001/0030863 A1 | 10/2001 | Constant et al. |
| 2002/0043566 A1 | 4/2002 | Goodman et al. |
| 2002/0116330 A1 | 8/2002 | Hed et al. |
| 2002/0153424 A1 | 10/2002 | Li |
| 2002/0170473 A1 | 11/2002 | Fettis et al. |
| 2002/0186131 A1 | 12/2002 | Fettis et al. |
| 2003/0019942 A1 | 1/2003 | Blossom |
| 2003/0107884 A1 | 6/2003 | Krietzman et al. |
| 2003/0123253 A1 | 7/2003 | Krietzman et al. |
| 2003/0201331 A1 | 10/2003 | Finkelstein |
| 2003/0209608 A1 | 11/2003 | Blossom |
| 2003/0218064 A1 * | 11/2003 | Conner et al. ............ 235/439 |
| 2003/0220144 A1 | 11/2003 | Brown |
| 2003/0226899 A1 | 12/2003 | Finkelstein |
| 2004/0026495 A1 | 2/2004 | Finkelstein |
| 2004/0026506 A1 | 2/2004 | Finkelstein |
| 2004/0035942 A1 | 2/2004 | Silverman |
| 2004/0041711 A1 | 3/2004 | Loewidt |
| 2004/0129787 A1 | 7/2004 | Saito et al. |
| 2004/0236819 A1 | 11/2004 | Anati et al. |
| 2004/0238210 A1 | 12/2004 | Droz |
| 2004/0242270 A1 | 12/2004 | Bhatt et al. |
| 2005/0019989 A1 | 1/2005 | Droz |
| 2005/0020337 A1 | 1/2005 | Simmons |
| 2005/0036640 A1 | 2/2005 | Goldenberg et al. |
| 2005/0044756 A1 | 3/2005 | Abrahams |
| 2005/0085005 A1 | 4/2005 | Droz |
| 2005/0092830 A1 | 5/2005 | Blossom |
| 2005/0227214 A1 | 10/2005 | Clegg |
| 2005/0247777 A1 | 11/2005 | Pitroda |
| 2005/0263596 A1 | 12/2005 | Nelson et al. |
| 2006/0003824 A1 | 1/2006 | Kobayashi et al. |
| 2006/0032906 A1 | 2/2006 | Sines |
| 2006/0080545 A1 | 4/2006 | Bagley |
| 2006/0108429 A1 | 5/2006 | Waters |
| 2006/0124350 A1 | 6/2006 | Droz |
| 2006/0131396 A1 | 6/2006 | Blossom |
| 2006/0136544 A1 | 6/2006 | Atsmon et al. |
| 2006/0148404 A1 | 7/2006 | Wakim |
| 2006/0156385 A1 | 7/2006 | Chiviendacz et al. |
| 2006/0157553 A1 | 7/2006 | Kelley et al. |
| 2006/0157555 A1 | 7/2006 | Dean et al. |
| 2006/0157556 A1 | 7/2006 | Halbur et al. |
| 2006/0161439 A1 | 7/2006 | Selg et al. |
| 2006/0162156 A1 | 7/2006 | Reed |
| 2006/0172458 A1 | 8/2006 | Droz |
| 2006/0186212 A1 | 8/2006 | Cooper |
| 2006/0226237 A1 | 10/2006 | Droz |

FOREIGN PATENT DOCUMENTS

| | | |
|---|---|---|
| KR | 10-2004-0069955 | 8/2004 |
| WO | WO 01/82248 | 11/2001 |
| WO | WO 01/82661 | 11/2001 |
| WO | WO 2006/080929 | 8/2006 |
| WO | WO 2006/087435 | 8/2006 |
| WO | WO 2006/101493 | 9/2006 |

OTHER PUBLICATIONS

International Search Rpt. & Written Opinion, Mar. 3, 2008.
International Search Rpt. & Written Opinion, Apr. 7, 2008.
Evors, J., "A password for your credit Cards", http://www.news.com (2006).
Dkretta, D., "Hallmark Rocks Out"; Express (2006).
Svoboda, E., "Charging Ahead", Popular Science (2007).

* cited by examiner

CARD CONFIGURED TO RECEIVE SEPARATE BATTERY

The application claims the benefit of U.S. Provisional Application No. 60/877,637, filed Dec. 29, 2006, which is herein incorporated by reference in its entirety.

FIELD OF THE INVENTION

The present invention is related to powered cards. More particularly, the present invention is related to flexible batteries that can be secured in a powered ISO 7816-compliant card or similar device.

BACKGROUND OF THE INVENTION

Powered ISO 7816 compliant cards, and other similar flexible and thin devices, (hereinafter, "cards") are becoming increasingly popular. Such cards include electronic circuitry and related components to provide features such as sound, lights, and alphanumeric displays for, among other things, secure token value generation. Powered cards having such features are produced by, e.g., Innovative Card Technologies of Los Angeles, Calif. and are described, for example, in U.S. Pat. Nos. 5,412,199; 5,434,405; 5,608,203; 5,856,661; 6,176,430; and 6,902,116, which are herein incorporated by reference in their entirety.

Powered cards present unique challenges. For example, to meet relevant ISO 7816 requirements, the battery that is selected as a power source must be highly efficient, flexible, and appropriately-sized. Further, depending on how often the powered functions of a given card are used, the battery may need to be replaced periodically. Further still, as environmental regulations become stricter, it may be necessary to separately dispose of the plastic card and the battery.

Prior art powered cards typically include an embedded, encapsulated and non-removable battery, thus making it difficult, if not impossible, to replace the battery or to separate the battery from the card for disposal. There is therefore a need to provide an improved approach to inserting and removing a battery from ISO 7816 compliant cards, and similar thin flexible devices.

SUMMARY OF THE INVENTION

In accordance with an embodiment of the present invention, an electronic card is provided that comprises a thin, flexible substrate having electrical circuitry embedded therein. An activation device is disposed in the substrate and is configured to complete a circuit in response to a stimulus, the stimulus being at least one of the group consisting of light, sound, motion, wireless signals, touch, and pressure. An output device is disposed in the substrate and is configured to produce an output, the output being at least one of the group consisting of light, sound, movement, graphics, a message, music, and vibration, wherein the output device is activated upon the completion of the circuit by the activation device. A cavity is formed in an outer surface of the substrate and has electrical contacts at an inner portion thereof. The electrical contacts are in electrical communication with the electrical circuitry and the cavity further comprises retaining means for replaceably retaining a battery inserted into the cavity. The retaining means is configured to hold a battery securely in the cavity to enable the battery to provide power to the electrical circuitry, the activation device, and the output device. The retaining means is further configured to allow a battery to be removed from the cavity and another battery to be inserted therein in order to continue electrical operation of the electronic card with power being provided by the other battery.

In accordance with another aspect of the present invention, a method of inserting a battery into an electronic card is provided that comprises providing an electronic card having electrical circuitry embedded in a thin, flexible substrate. The card has a cavity formed in a surface thereof for receiving a battery and tabs on at least two opposing sides of the cavity and extending over a portion of the cavity. The electronic card is bent with the surface having the cavity being on a convex side of the card such that the tabs move away from each other when the card is bent. A battery is inserted into the cavity while the card is bent, wherein the battery has a width that is wider than the distance between the opposing tabs when the card is not bent. The card is allowed to return to an unbent orientation wherein the tabs extend over portions of the battery, thereby retaining the battery in the cavity and in electrical communication with the electrical circuitry of the electronic card.

In accordance with a further aspect of the present invention, a method of transporting an electronic device is provided such that it is not powered during transport. The method includes mounting an electronic card to a substrate, the electronic card being thin and flexible, and having electrical circuitry and at least one electronic component embedded therein. The electronic card is in an unpowered state when fastened to the substrate. A battery is mounted to the substrate. The substrate is mailed with the electronic card and the battery mounted thereto, wherein the battery is configured to be inserted into a cavity in the electronic card by a recipient for powering the electronic device.

DETAILED DESCRIPTION

Figure 1A:
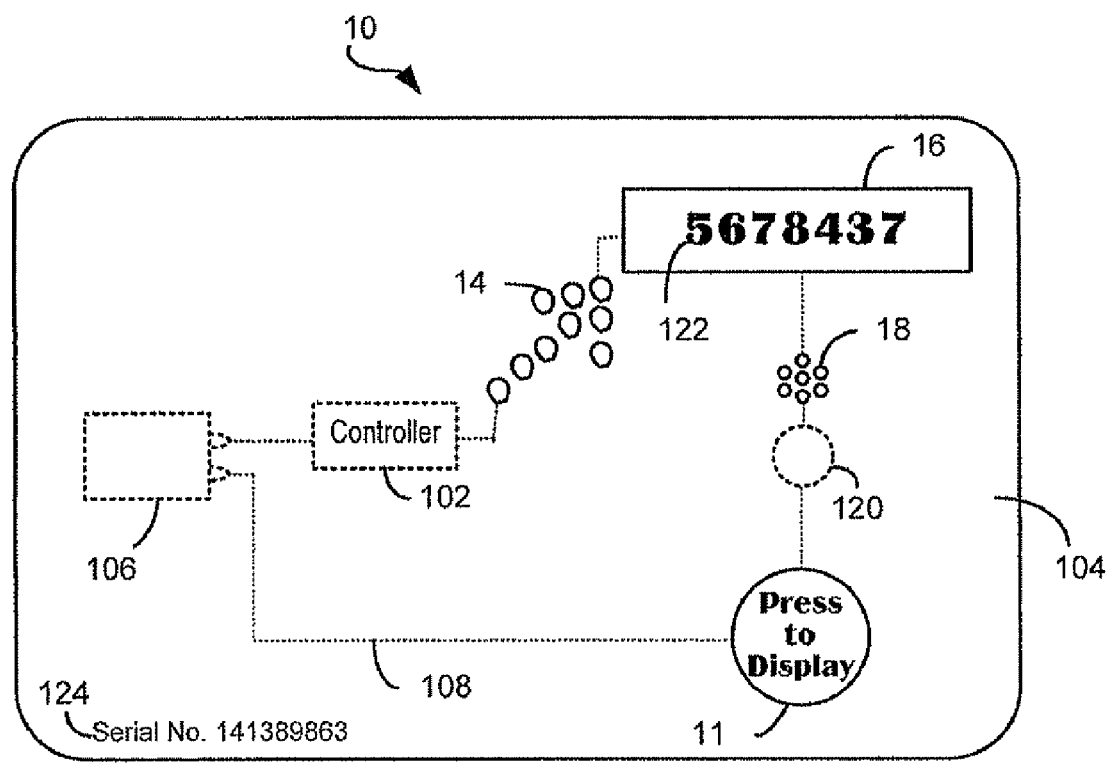
FIG. 1*a* is a schematic diagram of a powered card in accordance with an embodiment of the present invention.

Embodiments of the present invention provide card and battery configurations that enable the battery to be inserted into the card and, in some instances, removed therefrom as well.

An exemplary powered card comprises a thin, flexible substrate (e.g., paper, thin cardboard stock, or plastic) having an embedded battery and electrical circuitry. The powered card is preferably equal in size to a conventional credit card, and may meet at least the flexibility requirements of ISO 7816. Powered by the battery, the circuitry can activate electronic output devices that, for example, display an encrypted light array, display alphanumeric characters or graphics, or play a voice message. From this output, a user can obtain information necessary to complete a transaction, for example, authenticating access to a financial account. The card can be branded or printed and may be traded, collected, or distributed as part of a promotion.

The electrical circuitry can be activated by any means suitable for a particular application. For example, the circuitry can be activated by light sensors, audio sensors, motion sensors, wireless sensors, or mechanical switches (e.g., membrane switches). With light, audio, and motion, the powered card would be activated when the appropriate stimulus is received. With wireless sensors using, for example, radio frequency identification (RFID), Bluetooth™, WiFi, or near frequency communication (NFC) technology, the powered card would be activated by the appropriate wireless signal. With mechanical switches, the powered card can be, for example, activated by a user's pressing a button or multiple buttons, or by a sliding a switch. In some applications, a user-actuated mechanical switch may be preferred to save power and extend the shelf life of the powered card.

In an embodiment of the present invention, the circuitry and battery of a powered card is capable of insertion into a substrate equal in size to a conventional credit card, and meets at least the flexibility requirements of ISO 7816. An appropriate flexible battery for such an apparatus is available from Solicore, Inc. (Lakeland, Fla.), which produces batteries using polymer matrix electrolyte (PME). The batteries are ultra-thin, flexible, environmentally friendly, and safe, and preferably having the following characteristics:

- low profile design—approximately 0.3 mm thick;
- flexible and will not break or crack when bent or flexed;
- conformability, in that the electrolyte can be a solid, non-compressible film, which can be shaped and formed into a variety of designs;
- compatible with high speed printing and binding processes, and card manufacturing processes, and can survive hot lamination processes;
- operate over a wide temperature range (−20° C. to +60° C.);
- high ionic conductivity over a broad temperature range;
- low self discharge rates (less than 1% per month);
- high energy density (up to 300 Wh/l), providing maximum performance in smallest packages;
- self connecting terminals;
- non-toxic, disposable, and environmentally friendly;
- solid polymer electrolyte—no volatile liquids or gelling agents;
- overall safety: no out-gassing, swelling, or thermal runaway; no need for added safety devices; and passes UL requirements for crush test, drop test, and nail test; and
- inherently safe design reduces the need for additional battery safety circuitry.

The circuitry of the powered card includes at least one electronic output device that provides the user with information, such as a token value necessary for authentication. For example, the electronic output device can display an encrypted light array, alphanumeric characters, or a graphic, or can play a voice message. The user would then use the information for the purpose of authentication to obtain access to an associated system, such as a banking system or online game system.

FIG. 1a illustrates a powered card 10 according to an embodiment of the present invention. As shown, card 10 comprises a substrate 104, a battery 106, and circuitry 108. Substrate 104 can be paper or any other thin flexible material. Battery 106 and circuitry 108 are embedded in substrate 104 (e.g., sandwiched between a front and back face of substrate 104), as represented by the dashed lines. Circuitry 108 includes a controller 102, which may include, for example, a token value generator, a microprocessor, memory, clock, and any other necessary circuitry or devices. Circuitry 108 is controlled by a switch 11, such as a press button. Alternatively, circuitry 108 could be controlled by a light, audio, or motion sensor. Circuitry 108 also includes one or more electronic output devices that are activated when circuitry 108 is powered. For example, circuitry 108 can include an illumination device 14, a display 16, a speaker 18, and/or a vibrator 120.

As one of ordinary skill in the art would appreciate, circuitry 108 is shown only for illustration purposes and could include differently configured wires or conductive traces. For example, conductors to the illumination device 14 could be individually connected to each of the illumination elements (e.g., each LED or each electroluminescent device), or connected collectively such that the elements could be illuminated in unison, or some combination thereof. Similarly, if an alphanumeric or graphic display is used, the circuitry can be configured to drive the individual elements thereof in accordance with any desired sequence or design.

In one embodiment, substrate 104 comprises front and back faces made from cardstock and adhered together using adhesive. Battery 106, circuitry 108, and the other components are all sufficiently thin and flexible that the powered card has the same "feel" as a conventional cardstock playing card.

In another embodiment, substrate 104 comprises front and back faces made from plastic sheeting, similar to that used for a credit card-sized ISO 7816 compliant card. Optionally, thinner layers of plastics can be used to allow for increased flexibility.

In still another embodiment, card 10 is a built up by laminating multiple layers of plastic including graphics and clear cover layers. Card 10 may also be manufactured using injection molding and/or extrusion techniques. Although described in the context of a card form factor, those skilled in the art will appreciate that embodiments of the present invention also have applicability to any thin flexible substrate or material, regardless of size. For example, the invention has applicability to large sheets of plastic, rubber, vinyl, or cardboard (e.g., in the size of 8.5×11 letter size paper, poster size stock, and sheets of larger and smaller dimensions).

In operation, powered card 10 activates in response to completion of circuitry 108, which provides power from battery 106 to the electronic output devices. In this example, circuitry 108 is completed by pressing button 11. Alternatively, another mechanical switch, such as a slide switch, could be used to activate card 10.

Once circuitry 108 is closed, controller 102 and circuitry 108 activate one or more electronic output devices 14, 16, 18, and 120. For example, controller 102 and circuitry 108 can light illumination device 14 in a particular pattern that reveals a code, can display an alphanumeric message or graphic 122 on display 16, can play a sound, a message, or music through speaker 18 (e.g., a voice stating a code), or can activate vibrator 120 in a pattern that reveals a code. Illumination device 14 can comprise, for example, LED lights, incandescent lights, or electroluminescent devices. Display 16 can comprise, for example, an LCD screen, an electroluminescent display (such as those produced by Philips Electronics of Amsterdam; Sharp of Osaka, Japan; or Planar Systems, Inc. of Beaverton, Oreg.), or a printable electronic ink (such as those produced by E Ink of Cambridge, Mass., or Xerox of Palo Alto, Calif.). Speaker 18 can comprise, for example, a miniature speaker suitable for tight form factor applications. Vibrator 120 can comprise, for example, a miniature vibrator suitable for tight form factor applications, such as applications involving pagers and cellular telephones.

Figure 1B:
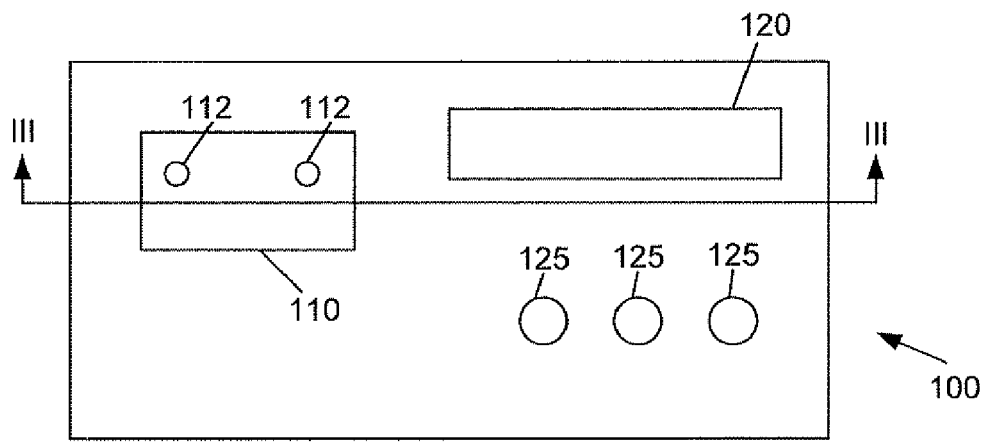
FIG. 1*b* is a simplified top plan view of a powered card with battery removed in accordance with an embodiment of the present invention.

FIG. 1*b* shows a more simplified top plan view of a powered card 100 (that may be ISO 7816 compliant) with a battery cavity 110. As noted before, powered card 100 may also include a display area 120 and one or more buttons 125 for controlling the functions of the card. These buttons 120 might simply control power to the card, or provide a numeric keypad, among other functions.

Figure 2A:
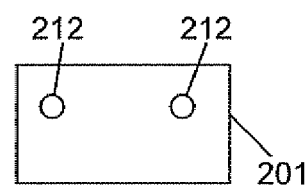
FIGS. 2*a* and 2*b* are bottom plan views of batteries in accordance with an embodiment of the present invention.
Figure 2B:
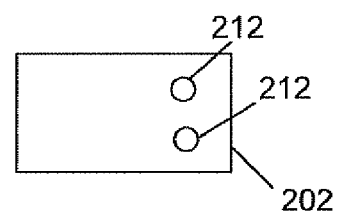
Figure 6:
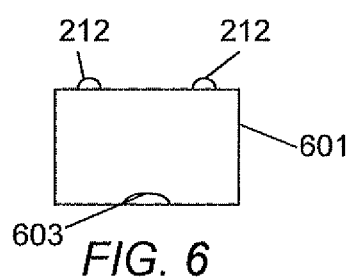
FIG. 6 shows an exemplary battery configured to work with the embodiment shown in FIGS. 4 and 5.

Although shown as being inset from a top face of the card, cavity 110 can be inset from a bottom face of the card as well. Cavity 110 preferably has a shape that corresponds to the shape of a battery that is secured in cavity 110. Exemplary batteries 201, 202, 601 are shown in FIGS. 2*a*, 2*b*, and 6. In a preferred implementation, the battery 201, 202, or 601 is encased in a thin plastic material (such as PVC or any material that substantially matches the material properties of the card 100 itself) that protects the battery, provides a mounting surface for electrical contacts 212, but does not impact the overall flexibility properties of the battery or of card 100. Batteries suitable for this purpose are available, as mentioned above, from Solicore, Inc. (Lakeland, Fla.).

Inside cavity 110 are preferably provided two electrical contacts 112 for connecting with corresponding battery contacts 212 when the battery is inserted in cavity 110. Although not shown in FIG. 1*b*, contacts 112 are electrically connected to a circuit embedded in card 100 for controlling or driving display area 120, as well as any light or sound functions. As shown, the contacts may be in any convenient location including on a side or edge of the battery and cavity. For instance, battery 601, shown in FIG. 6, includes edge contacts 212.

Figure 3A:
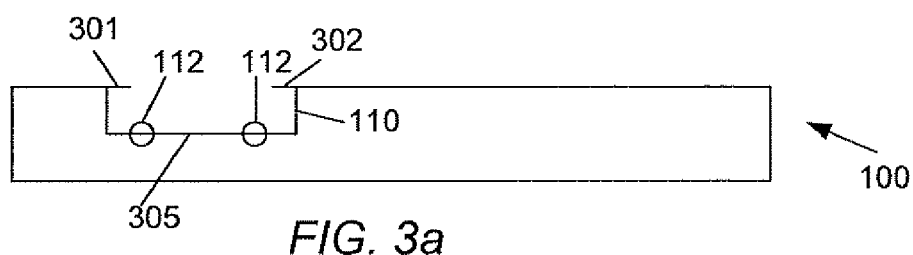
FIG. 3*a* is a cross sectional view along line III-III in FIG. 1.

FIG. 3*a* shows one embodiment for securely capturing a battery in cavity 110 of card 100. Specifically, a top sheet of card 100 includes overhangs or tabs 301, 302 that may be disposed entirely or partially around the perimeter of cavity 110. When the battery is pushed into the cavity, the tabs flex and permit the battery to make contact with the bottom 305 of cavity 110. The tabs may then flex, or snap, back thereby capturing the battery within the cavity. The tabs 301, 302 are designed such that during normal flexing of card 100, the battery does not inadvertently pop out of the cavity 110. The tabs may be made of plastic, metal, or any other material sufficiently resilient to provide the necessary flexing and battery capturing functionality.

The tabs may also be designed such that when an appropriate amount of pressure is applied from a face of the card opposite the face into which cavity 110 is inset, the battery may be inserted into or forced out of cavity 110. In this manner, the electronic card may be bent in a direction such that the surface having the cavity 110 is on a convex side of the card. By doing this, the tabs move away from each other and allow an increased access opening to the cavity 110. When the card is in the bent orientation, a battery may be inserted into the cavity. As such, a battery that has a width that is wider than the distance between the tabs when the card is not bent will more easily fit between the tabs when the card is in the bent orientation. After insertion of the battery, the card is allowed to return to its unbent orientation and the tabs may thereby retain the battery in the cavity by extending over at least some portions of the battery. When the battery is in the cavity, it is in electrical communication with the electrical circuitry in order to power the electronic card and enable the use of the electronic components disposed therein. In this embodiment, the tabs do not need to flex at all.

Figure 3B:
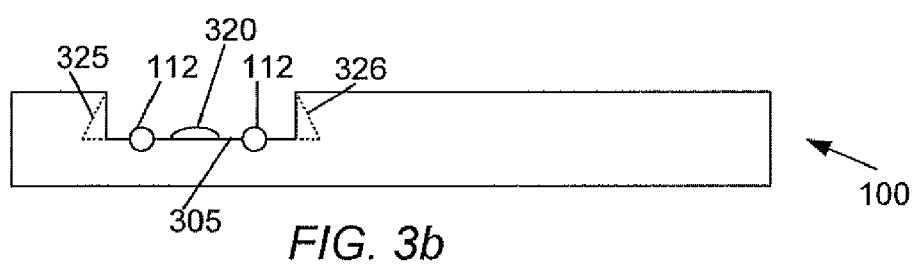
FIG. 3*b* is a cross sectional view of an alternative configuration along line III-III in FIG. 1.

FIG. 3*b* illustrates other possible configurations in addition to or exclusive of the configuration shown in FIG. 3*a*. FIG. 3*b* depicts a spot or drop of glue 320 that may be, e.g., pressure sensitive and activated only when a battery is pushed against it upon insertion in cavity 110. Although glue is shown, those skilled in the art will appreciate that other forms of adhesive agents may also be used instead of or in addition to glue, such as tape. In another embodiment, the thin plastic material that encases the battery may be configured to be reactive with all or portions of the exposed surfaces of cavity 110 such that upon contact between the thin plastic material and the portions of exposed surfaces, the two materials become chemically welded or bonded together. Also shown in FIG. 3*b* are undercuts 325, 326, which may or may not run the length of the perimeter of the cavity. Such an undercut for a cavity in a card is disclosed in U.S. Pat. No. 5,975,584, which is hereby incorporated by reference.

Still another approach for securing a battery in cavity 110 is to use a micro screw or pin (not shown) that passes through a portion of the casing of the battery and into a predrilled and tapped hole in the card. The hole may be integral with the plastic of the card itself, or may include, e.g., a metal tapped element embedded in the card.

Figure 4:
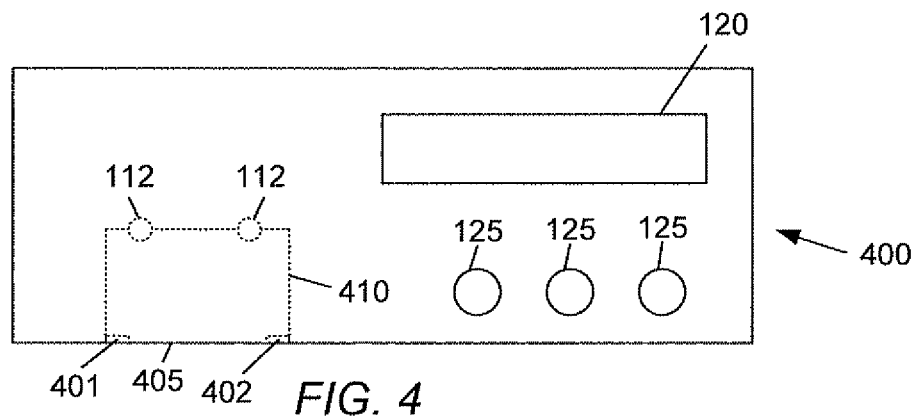
FIG. 4 is a top plan view of a powered card with battery removed in accordance with another embodiment of the present invention.
Figure 5:
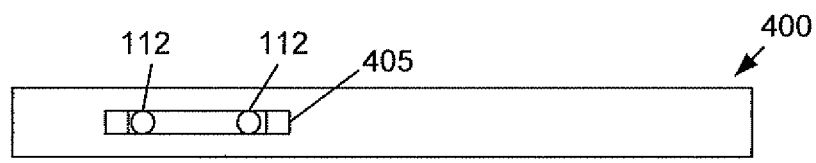
FIG. 5 shows a side view of the embodiment of FIG. 4.

FIGS. 4 and 5 show still another embodiment of the present invention wherein a card 400 is configured to include a slot 405 in an edge thereof. FIG. 4 is a plan view showing a cavity 410 (in broken line) that is below at least one layer of the card and that is accessed via edge slot 405. FIG. 5 shows this same configuration from a side view. In one possible implementation, an internal layer of a card having, e.g., multiple layers, is milled to produce the cavity 410. Alternatively, during a lamination, molding, or extrusion process for the card 400, a blank (not shown) may be used to keep the volume of the cavity free of molten plastic. Near the end of the lamination or extrusion process, the blank may be removed leaving cavity 410. As in the embodiment shown in FIG. 3*a*, overhangs or tabs 401, 402 may be provided to better secure the battery in cavity 410.

Contacts 112 in cavity 410 may also be provided in the positions shown, or at other positions depending on the configuration of the corresponding contacts on the battery 601 (FIG. 6). For instance, the contacts on the battery may be disposed on one of the main faces (as opposed to the edge) of the battery. Contacts in the cavity 410 would then likewise have to be in an appropriate position on a main face (not side wall) of the cavity. Although not shown, glue or tape (or chemically reactive materials) may also be used help retain the battery in cavity 410. To assist in removing the battery from cavity 410, the battery (see FIG. 6) may include a small cut out 603 that matches the size of a fingernail.

Another embodiment to allow for relatively simple battery insertion and removal is to configure slot 405 to operate like a secure digital (SD) memory card connector and the battery to have a corresponding form factor to match the connector. Those skilled in the art appreciate that SD cards are configured to be pushed into a corresponding connector or socket, and can be released therefrom by again pushing on an edge of the SD card. Details regarding the configuration of SD card connectors may be gleaned from manufacturers of such connectors, including, e.g., JALCO CO., LTD. (Tokyo, Japan). In one implementation, slot 405 includes a spring loaded mechanism that allows a battery to be pushed into the cavity to be retained therein, and to be released from the cavity when the battery is pushed again. It is noted that SD cards are also typically "keyed" (a corner may be cut off) so that they may be inserted in only one predetermined orientation. This keyed feature may also be desirable for batteries designed for cards in accordance with the present invention in order to ensure proper polarity matching.

Figure 7:
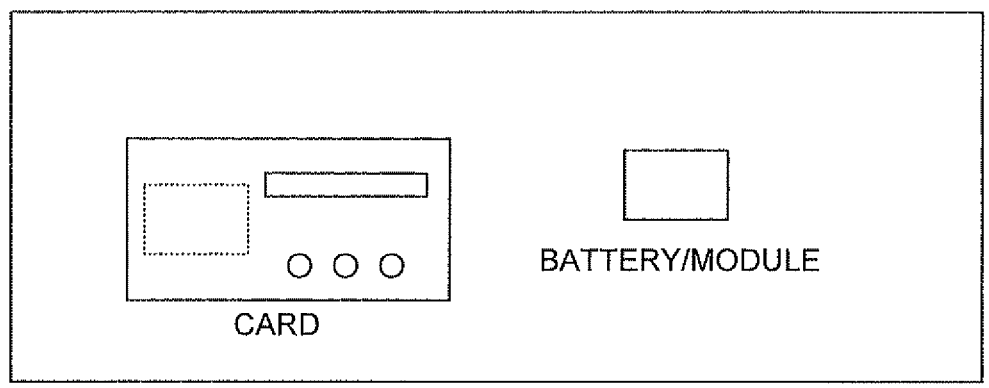
FIG. 7 illustrates an exemplary mailing piece on which are separately mounted a card and a battery in accordance with an embodiment of the present invention.

FIG. 7 depicts a mailing piece in accordance with the present invention that may be placed in an envelope and mailed, e.g., via postal service. As shown, a card and a battery are mounted next to each other on a substrate (e.g., paper, cardboard, etc.) using mounting glue, tape, corner cutouts, or other means of holding the components in place. When a card holder (user) receives such a mail piece, the user peels off both items and snaps or inserts the battery into place within the card. In this way, and in compliance with relevant postal service regulations, the card itself is not powered as it is handled by the postal service.

In an alternative embodiment, a complete module that integrates both the battery and electronic circuit for controlling or driving the display, lights, and/or sound functions is provided for insertion into the powered card. Contacts and associated conductive traces within the card can be configured such that only when the module is inserted, plugged, or snapped into the card will the electronic circuit become operative. This approach not only avoids having to send "live" electrical circuits through the mail, but also avoids unnecessary or inadvertent battery drainage before the card is ever provided to an end user.

A powered card configured to receive a separate battery in accordance with the present invention has several benefits, including, as mentioned above, the ability to mail a powered card in full compliance with the applicable postal regulations.

Also, with normal use, the battery of the powered card will eventually drain. By having the ability to remove or extract the battery from the card, the battery can be easily replaced thereby allowing the user to retain his/her original card. This may be important economically since the battery may be significantly less expensive than the card itself. For instance, the powered card may include biometric detection functionality (e.g., fingerprint detection) that may be effective for 10 years or more, but the battery may not be able to provide power for that period of time. And because the battery is separable or removable from the card, it is also possible for the user to dispose of the battery separately from the card itself. This may become more important as environmental regulations become stricter regarding disposal of certain items.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

What is claimed is:

1. An electronic card comprising:
a substrate having electrical circuitry embedded therein;
an activation device disposed in the substrate configured to complete a circuit in response to a stimulus, the stimulus being at least one of the group consisting of light, sound, motion, wireless signals, touch, and pressure;
an output device disposed in the substrate configured to produce an output, the output being at least one of the group consisting of light, sound, movement, graphics, a message, music, and vibration, wherein the output device is activated upon completion of the circuit by the activation device; and
a cavity formed in an outer surface of the substrate, the cavity having electrical contacts at an inner portion thereof, the electrical contacts being in electrical communication with the electrical circuitry, and the cavity further comprising retaining means for replaceably retaining a battery inserted into the cavity,
wherein the retaining means comprises tabs extending over the cavity from at least two opposing sides of the cavity, wherein the retaining means is configured to hold a battery securely in the cavity to enable the battery to provide power to the electrical circuitry, the activation device, and the output device, the retaining means being further configured to allow a battery to be removed from the cavity and another battery to be inserted therein in order to continue electrical operation of the electronic card with power being provided by the other battery;
wherein the card complies with at least the flexibility requirements of ISO 7816;
wherein the card further comprises a battery held by the retaining means;
wherein the battery also complies with the flexibility requirements of ISO 7816;
wherein the battery has a width that is wider than the distance between the opposing tabs;
wherein the tabs move away from each other when the card is bent with the surface having the cavity being on a convex side of the card to allow for insertion or removal of the battery; and
wherein the battery is retained in the cavity and in electrical communication with the electrical circuitry of the electronic card by the tabs when the card is returned to an unbent orientation.

2. The electronic card of claim 1, wherein the substrate is made of paper or cardboard stock.

3. The electronic card of claim 1, wherein the substrate is made of plastic and is approximately equal in size to a conventional credit card.

4. The electronic card of claim 1, wherein the battery comprises a cut out sized such that the battery may be aided in removal by a user's fingernail.

5. The electronic card of claim 1, wherein the electronic card is ISO 7816 compliant.

6. A method for inserting a battery into an electronic card comprising:
providing an electronic card having electrical circuitry embedded in a substrate, the card having a cavity formed in a surface thereof for receiving a battery and tabs on at least two opposing sides of the cavity and extending over a portion of the cavity;
bending the electronic card with the surface having the cavity being on a convex side of the card such that the tabs move away from each other when the card is bent;
inserting a battery into the cavity while the card is bent, wherein the battery has a width that is wider than the distance between the opposing tabs when the card is not bent; and
releasing the card to return to an unbent orientation wherein the tabs extend over portions of the battery, thereby retaining the battery in the cavity and in electrical communication with the electrical circuitry of the electronic card;
wherein the battery complies with the flexibility requirements of ISO 7816.

7. The method of claim 6, wherein the electronic card complies with at least the flexibility requirements of ISO 7816.

8. The method of claim 6, wherein the electronic card is ISO 7816 compliant.

* * * * *